3,522,127
BONDING TEXTILE MATERIALS TO RUBBER CONTAINING HEXAMETHYL ETHER OF HEXAMETHYLOLMELAMINE
Alan Paul Osborne, Wood End, near Atherstone, and John Ince, Bromsgrove, England, assignors, by mesne assignments, to Farbenfabriken Bayer Aktiengesellschaft, Leverkusen, Germany, a corporation of Germany
No Drawing. Continuation of application Ser. No. 323,883, Nov. 15, 1963. This application June 24, 1968, Ser. No. 744,607
Claims priority, application Great Britain, Nov. 30, 1962, 45,279/62
Int. Cl. B32b 25/10, 27/42; C09j 3/12
U.S. Cl. 156—334                                      5 Claims

ABSTRACT OF THE DISCLOSURE

A method of bonding textile materials to rubber compositions by means of phenol-formaldehyde bonding agents, in which the formaldehyde is generated from a compound which is stable up to temperatures from 100°–150° C. and consisting of ethers of hexamethylolmelamine.

---

This application is the continuation of U.S. application, Ser. No. 323,883 filed Nov. 15, 1963 now abandoned.

This invention relates to the bonding of textile materials to rubber.

In the production of composite articles of textiles and rubber in which the textile serves to reinforce the rubber it is essential to provide a good bond between the textile component and the rubber component.

This is important, for example, in the production of articles such as pneumatic tyres, mechanical belting and hose in which the textile is generally used in the form of cords.

It is known that improved adhesion between rubber compositions and textile materials is obtained by first treating the textile with a suitable adhesive such as an aqueous dispersion of an incompletely condensed phenol-aldehyde in admixture with a natural latex or a synthetic latex such as a terpolymer of butadiene, styrene and vinyl pyridine.

It has now been found that by a specific modification of the rubber composition improved adhesion of rubber to textile material can be obtained.

According to the present invention a method of bonding a textile material to a natural or synthetic rubber composition comprises incorporating in the said composition a polyhydric phenol, a stable formaldehyde-generator as hereinafter defined and vulcanizing ingredients, applying the textile material to the resulting rubber composition and vulcanizing the assembly.

By a stable formaldehyde-generator in this specification there is meant a compound which is substantially stable up to temperatures between 100° C. and 150° C.

Examples of formaldehyde-generators suitable for use in this invention are hexamethoxymethylmelamine, lauryloxymethyl pyridinium chloride, cethyloxymethyl pyridinium chloride, ethyl oxymethyl pyridinium chloride and also polymers of formaldehyde having stabilizing groups, or residues of substances such as pentaerythritol, at the ends of the molecule.

Such polymers of formaldehyde as paraformaldehyde, metaldehyde and trioxymethylene readily lose formaldehyde at temperatures lower than 100° C. and improvement in adhesion when such polymers are used is generally not so great as with the stabilized formaldehyde-generators and, moreover, cannot be relied upon.

The stable formaldehyde-generators of this invention are present preferably in an amount of from 0.5 part to 6 parts per 100 parts of the rubber elastomer in the rubber composition.

The preferred polyhydric phenols are the metadihydroxy phenols such as resorcinol; 1,5-naphthalene diol can also be used and the polyhydric phenol is incorporated in the rubber composition preferably in an amount of from 0.5 part to 6 parts per 100 parts of the rubber elastomer in the rubber composition.

The textile material can consist of any of the well known natural or synthetic textile materials. The invention is of particular value in the bonding of cords such as rayon and nylon cords. Improved adhesion is obtained by the method of the invention both when the textile material is untreated and also when the textile is previously treated with one of the conventional latex resorcinol formaldehyde cord adhesives.

Rubber compositions which can be used include any of the conventional compositions based on natural rubber, butadiene/styrene rubbers, chloroprene rubbers, nitrile rubbers and blends thereof, and other butadiene copolymers it being desirable to incorporate the polyhydric phenol and the formaldehyde-generator prior to the addition of the vulcanizing ingredients. In a preferred method the polyhydric phenol is incorporated with all the other compounding ingredients except the sulphur and the accelerators of vulcanization into the rubber in an internal mixer to ensure optimum dispersion of the phenol in the rubber, and the formaldehyde-generator is added later, on a rubber mill, immediately before the incorporation of the vulcanizing ingredients.

The invention is illustrated by the following examples, all parts being parts by weight:

EXAMPLE I

A conventional natural rubber compound was used and various proportions of resorcinol and of hexamethoxymethylmelamine were incorporated. The basic compound had the following composition:

|   | Parts |
|---|---|
| Natural rubber | 100.0 |
| Fast extruding furnace black | 46.0 |
| Zinc oxide | 6.0 |
| Stearic acid | 1.0 |
| Sulphur | 2.6 |
| N-cyclohexyl-2-benzthiazole-sulphenamide | 0.7 |
| N-nitrosodiphenylamine | 0.5 |
| Pine tar | 6.0 |
| Mineral oil | 4.0 |
| | 166.8 |

Rubber compositions having the above formulation and also with varying amounts of added resorcinol and hexamethoxymethylmelamine, as indicated in parts per 100 parts of rubber in the tables, were used and cords adhered therein, the assemblies then being vulcanized for 25 minutes at 148° C. (50 p.s.i. steam). The strength of the bond between the cords and the rubber was measured by the pull-through test described by J. O. Wood, Trans I.R.I., 32, 1, 1 to 18 (1956).

The pull-through force figures, in pounds, required to remove one centimetre of adhered nylon or rayon cord from the cured rubber, are given in the following tables, each figure being the average of 15 pull-through tests. The nylon cord used was 2 yarn 840 denier and the rayon cord 2 yarn 1650 denier.

In the tables Hm is an abbreviation for hexamethoxymethylmelamine.

TABLE I.—UNTREATED CORDS

|  | Hm | Nylon | Rayon |
|---|---|---|---|
| Resorcinol: |  |  |  |
| 0 | 0 | 4.3 | 4.0 |
| 1.1 | 1.3 | 7.4 | 6.5 |
| 2.2 | 2.6 | 10.1 | 8.3 |
| 3.3 | 3.9 | 12.1 | 9.4 |
| 4.4 | 5.2 | 11.8 | 12.0 |

The effect of the presence of resorcinol and hexamethoxymethylmelamine in the rubber composition upon its adhesion to treated nylon and rayon cords was also determined. The two types of cord were treated each with a different latex resorcinol formaldehyde dispersion or "dip." The two latex dips had the following formulae, all parts being parts by dry weight, the total solids content and minimum maturing time for each dip being also specified in the formulae:

B/s/vp is a 70/15/15 butadiene/styrene/vinyl pyridine terpolymer and B/s(c) is a 75/25 butadiene/styrene copolymer prepared by cold polymerization.

|  | Nylon Dip | Rayon Dip |
|---|---|---|
| Resorcinol, parts | 11.0 | 11.0 |
| Formaldehyde, parts | 6.0 | 6.0 |
| Sodium hydroxide, parts | 0.3 | 1.3 |
| B/s/vp, parts | 100.0 | 40.0 |
| B/s(c), parts |  | 60.0 |
| Total solids, percent | 20 | 12.5 |
| Maturing time, hours | 6 | 24 |

TABLE II.—TREATED NYLON CORD

|  | Hm | Adhesion |
|---|---|---|
| Resorcinol: |  |  |
| 0 | 0 | 18.6 |
| 1.1 | 1.1 | 20.1 |
| 2.2 | 1.4 | 19.5 |
| 3.3 | 3.9 | 19.7 |
| 4.4 | 4.4 | 18.8 |

Table III shows the improved "wet adhesion" for treated rayon cord obtained when the rubber composition contained resorcinol and hexamethoxymethylmelamine, the test samples having been soaked in water for 24 hours before the test was made.

TABLE III.—TREATED RAYON CORD

|  | Hm | Wet Adhesion |
|---|---|---|
| Resorcinol: |  |  |
| 0 | 0 | 6.8 |
| 1.1 | 1.1 | 9.0 |
| 4.4 | 5.2 | 10.4 |

The results of Example I show that both with untreated and dipped rayon cords the addition of resorcinol and hexamethoxymethylmelamine to the rubber composition gives improved adhesion, as indicated by the pull-through figures.

EXAMPLE II

In this example, there was used a rubber composition having the following basic formula in which B/s refers to a 72/18 butadiene/styrene copolymer produced by low temperature copolymerization, and Pdtq to polymerized 1,2-dihydro-2,2,4-trimethylquinoline.

| | Parts |
|---|---|
| Natural rubber | 70.0 |
| B/s | 30.0 |
| Fast extruding furnace black | 30.0 |
| Zinc oxide | 5.0 |
| Sulphur | 3.0 |
| Stearic acid | 1.0 |
| Mercaptobenzthiazole | 0.5 |
| Tetramethylthiuradisulphide | 0.05 |
| N-cyclohexyl-2-benzthiazole sulphenamide | 0.5 |
| N-nitrosodiphenylamine | 0.5 |
| Pdtq | 2.3 |
| Pine tar | 3.0 |
| Mineral oil | 3.0 |
| Tyre reclaim | 60.0 |
|  | 208.85 |

Rubber compositions were prepared having varied amounts of resorcinol and hexamethoxymethylmelamine and nylon and rayon cords treated with cord adhesives as in Example I (Tables II and III respectively) were prepared and bonded in these rubber compositions.

In this example pull-through (dry) tests were made at a temperature of 100° C. and the results given in Table IV were obtained.

TABLE IV

|  | Hm | Rayon | Nylon |
|---|---|---|---|
| Resorcinol: |  |  |  |
| 0 | 0 | 11.1 | 8.9 |
| 1.1 | 1.1 | 13.3 | 10.5 |
| 2.2 | 2.2 | 12.8 | 10.3 |
| 2.2 | 2.6 | 14.9 | 10.6 |
| 3.3 | 3.3 | 14.0 | 11.2 |

The results shown in Table IV indicate that the addition of resorcinol and hexamethoxymethylmelamine to the rubber composition results in improved "hot" adhesion between dipped cords and the rubber composition for both rayon and nylon.

EXAMPLE III

Using natural rubber composition described in Example I as the basis, amounts of resorcinol and hexamethoxymethylmelamine as parts per hundred parts of rubber were incorporated as shown in Table V.

Nylon and rayon cords were treated with the nylon dip as described in Example I, except that the total solids content of the adhesive was reduced from 20 percent to 10 percent. Vulcanization and testing were as for Example I, the adhesion tests being carried out at room temperature.

TABLE V

|  | Hm | Rayon | Nylon |
|---|---|---|---|
| Resorcinol: |  |  |  |
| 0 | 0 | 20.2 | 14.9 |
| 2.0 | 1.8 | 27.8 | 17.4 |
| 2.0 | 2.4 | ¹28.8 | 20.9 |
| 2.0 | 3.0 | ¹29.2 | 18.8 |

¹ Indicates cord break at the average pull given in the table.

The adhesion figures of Table V show the improved bonding obtained between both rayon and nylon cords previously treated with a latex resorcinol formaldehyde adhesive, and a natural rubber composition, when there is incorporated in the rubber composition both resorcinol and hexamethoxymethylmelamine. The figures also make clear that further increased adhesion obtained when the hexamethoxymethylmelamine content of the composition is increased from 1.8 to 2.4 parts per 100 parts of rubber elastomer in the rubber composition.

What is claimed is:

1. A method of improving the process of bonding a textile material to a rubber composition which comprises incorporating in said composition vulcanizing ingredients, a polyhydric phenol and hexamethyl ether of hexamethylolmelamine, applying the textile material to the resulting rubber composition and vulcanizing the resulting rubber composition.

2. A method according to claim 1, in which the polyhydric phenol is resorcinol.

3. A method according to claim 1, in which the polyhydric phenol is present in an amount of from 0.5 to 6 parts per 100 parts by weight of the rubber in the rubber composition.

4. A method according to claim 1, in which the hexamethylolmelamine ether is present in an amount of from 0.5 to 6 parts per 100 parts by weight of the rubber in the rubber composition.

5. A method according to claim 1, in which the textile material has been previously treated with a latex resorcinol cord adhesive.

References Cited

UNITED STATES PATENTS

| | | | |
|---|---|---|---|
| 2,927,051 | 3/1960 | Buckwalter et al. | 161—241 X |
| 3,018,207 | 1/1962 | Danielson. | |
| 3,194,294 | 7/1965 | Van Gils | 152—330 |
| 3,212,955 | 10/1965 | Kaizreman | 161—88 |

OTHER REFERENCES

"Polymer Processes," Schildknecht, C. E., pp. 338, 339 Interscience Publishers, New York City, 1956.

JOHN T. GOOLKASIAN, Primary Examiner

C. B. COSBY, Assistant Examiner

U.S. Cl. X.R.

156—110, 331, 335, 338; 161—227, 241, 248, 257, 260; 260—3, 852, 856